United States Patent Office 2,907,633
Patented Oct. 6, 1959

2,907,633
PROCESS FOR PRODUCING ALUMINUM SALTS

Felix Seidel, Wolfen, and Walter Singer, Dessau-Haideburg, Germany, assignors to VEB Farbenfabrik Wolfen, Wolfen, Germany No Drawing. Application August 13, 1957
Serial No. 677,814

Claims priority, application Germany September 13, 1956

5 Claims. (Cl. 23—92)

This invention relates to a process for producing aluminum salts and, more particularly, to a process for producing aluminum salts of mineral acids.

Aluminum salts of for instance mineral acids, have been produced by reacting oxides, hydroxides or silicates of aluminum with the corresponding acids. When using aluminum silicates, e.g. clay or kaolin in such a process, preliminary drying of the silicate followed by calcining within a definite temperature range is necessary in order to obtain yields which are of practical value. In accordance with this prior art process, within the optimum temperature range, treatment with sulfuric acid converts about 90% of the alumina in the clay to aluminum sulfate, and treatment with hydrochloric acid converts about 85% of the alumina to aluminum chloride. Furthermore, aluminum salts have also been prepared by boiling calcined clay with solutions of iron salts under normal pressure. The yields which can be obtained in this connection are, however, very low and do not lend themselves to practical utilization. The previously known methods therefore require either an alumina hydrate or oxide or annealed clay or kaolin as starting material.

It is an object of the present invention to provide a simple and economical process for preparing aluminum salts in high yields.

Other and more detailed objects will be apparent from the following specification and claims.

It has now been found that the production of aluminum salts is simplified and the yields obtained increased over that obtained by prior art processes if an aluminum silicate, such as unburned clay, is reacted with solutions of iron salts, which hydrolyze at higher temperatures in a closed vessel at temperatures above 100° C. In a preferred form of this invention, an aqueous solution of the iron salt is used for counter-current leaching of the aluminum silicate. In the production of the aluminum sulfate, an aqueous solution of ferric sulfate is employed for the leaching.

The process of the present invention may be used to prepare any aluminum salt. However, it has particular application in the preparation of aluminum salt of mineral acids. By way of illustration, the iron salts of the following acids may be used in accordance with the process of this invention: sulfuric, hydrochloric and nitric acid. The salts of the above mentioned acids are preferably employed in aqueous solutions.

The relative proportions of the various reactants used in the process of the present invention will vary with the particular iron salt employed and the conditions of reaction, but the iron salt always is used in excess. Only the latter condition makes quantitative yields possible.

As noted above, the process of the present invention is carried out at a temperature above 100° C. The upper limit of temperature that may be employed will vary with the particular iron salt employed and the particular nature of the aluminum silicate used. In general, the temperature that may be used in accordance with the present invention, will be in the range of about 100° C. to 300° C. The preferred operating range is about 175° C. to 250° C.

One of the advantages of the process of this invention resides in the saving of the expense previously necessary for the drying and calcining of the clay. Furthermore almost quantitative yields can be obtained. This is surprising since a reaction of unburned clay, even with concentrated mineral acids leads only to low yields which are of little value in practical operation. Furthermore, when treating alumina silicates with acids, for instance sulfuric acid at temperatures above 175° C. in a closed vessel, the yields, as is known, become lower and lower with an increase in the temperature.

In the view of this, the obtaining of an almost quantitative yield by the use of the method in accordance with the present invention is new and surprising.

The following example is further illustrative of the present invention. It is to be understood, however, that the invention is not restricted to the specific embodiments described herein in detail.

Example I 10 grams of unburned clay containing $Al_2O_3=28.6\%$, $SiO_2=54.5\%$, $Fe_2O_3=3.3\%$, $TiO_2=3.6\%$, ignition loss=9.5%, are mixed with 100 cc. of 20% ferric sulfate solution and treated for 3 hours at 250° C. The filtrate after the first leaching contains, dissolved in it, 48.5% of the $Al_2O_3$ contained in the clay.

By repeating this process a total of three times, 99.8% of the $Al_2O_3$ contained in the clay is obtained as aluminum sulfate. The residue contains $Al_2O_3=0.0\%$, $Fe_2O_3=49.8\%$, $TiO_2=2.8\%$, $SiO_2=37.3\%$, ignition loss=9.7%.

The same results are obtained by continuous countercurrent leaching at 250° C.

Example II 10 grams of the same clay as mentioned in the example above, containing 2.815 grams=28.15% $Al_2O_3$, are heated in a closed vessel for four hours at a temperature of 200° C. in presence of 100 cc. of 10% ferric chloride solution. After the first leaching the filtrate contains 34.1% of the $Al_2O_3$ contained in the clay. By repeating this process a total of three times, 99.6% of the $Al_2O_3$ contained in the clay is obtained as aluminum chloride.

The same results are obtained by continuous countercurrent leaching at 200° C.

While the invention has been described with particular reference to specific embodiments, it is to be understood that it is not limited thereto but is to be construed broadly and restricted solely by the scope of the appended claims.

What is claimed is:

1. A process for producing aluminum sulfate which comprises, mixing unburned clay with a 20% solution of ferric sulfate in a closed vessel, heating said mixture for about 3 hours at a temperature of about 250° C., filtering the mixture, repeating said treatment for a total of three times and collecting and combining the filtrate from each treatment, whereby substantially all of the aluminum silicate is converted into aluminum sulfate and collected in the combined filtrate.

2. A process for producing aluminum chloride which comprises mixing unburned clay with a 10% solution of ferric chloride in a closed vessel, heating said mixture for about 4 hours at a temperature of about 200° C., filtering the mixture, repeating said treatment for a total of three times and collecting and combining the filtrate from each treatment, whereby substantially all of the aluminum silicate is converted into aluminum chloride and collected in the combined filtrate.

3. A process for the preparation of an aluminum salt of a mineral acid selected from the class consisting of hydrochloric, sulfuric and nitric acids, which comprises treating an aluminum silicate bearing material, which has not been previously heat treated, with an aqueous solution wherein the solute consists essentially of a ferric salt of an acid selected from the group consisting of hydrochloric, sulfuric and nitric acids in a closed vessel at temperatures in the range of from about 175° C. to about 250° C. and recovering the aluminum salt of said mineral acid, said ferric salt being present in stoichiometric excess with respect to said aluminum silicate.

4. A process according to claim 3 wherein said aqueous ferric salt solution is at least a 10% solution.

5. A process according to claim 3 wherein the aluminum silicate bearing material is unburned clay.

References Cited in the file of this patent

UNITED STATES PATENTS

| 1,964,382 | Fleischer | June 26, 1934 |

FOREIGN PATENTS

| 240,834 | Great Britain | May 13, 1926 |